US000001826H

United States Statutory Invention Registration [19]

[11] Reg. Number: H1,826

Anderson et al.

[45] Published: Jan. 4, 2000

[54] VERTICAL CHAMBER, OPEN THROAT ROUND BALER HAVING NO STARTER ROLL

[75] Inventors: J. Dale Anderson, Canton; Howard J. Ratzlaff, Hesston; Ferol S. Fell, Newton, all of Kans.

[73] Assignee: Hay & Forage Industries, Hesston, Kans.

[21] Appl. No.: 08/896,720

[22] Filed: Jul. 18, 1997

[51] Int. Cl.[7] ..... A01D 39/00

[52] U.S. Cl. ..... 56/341

[58] Field of Search ..... 56/341, 343; 100/88

[56] References Cited

U.S. PATENT DOCUMENTS

| | | | |
|---|---|---|---|
| 4,580,398 | 4/1986 | Bruer et al. | 56/341 |
| 4,766,717 | 8/1988 | Thomann | 56/341 |
| 5,450,704 | 9/1995 | Clostermeyer | 56/341 X |
| 5,595,055 | 1/1997 | Horchler, Jr. et al. | 56/341 |

*Primary Examiner*—Charles T. Jordan
*Assistant Examiner*—Meena Chelliah
*Attorney, Agent, or Firm*—Hovey, Williams, Timmons & Collins

[57] ABSTRACT

The vertical chamber of the open throat, vertical chamber baler has its bottom inlet opening devoid of a starter roll. A resilient rotary rake tine assembly positioned below and ahead of the inlet opening picks up crop material from the ground and delivers it to a rigid tooth feeder spaced below the inlet opening in vertical alignment therewith. At the beginning of each bale forming cycle when the chamber is small and empty, the rigid tooth feeder propels the crop material into the chamber and against the upwardly moving rear belt stretch which encourages the material to tumble forwardly against the downwardly moving front belt stretch. The oppositely moving surfaces presented by the front and rear belt stretches encourage the tumbling material to coil into a bale core, which ultimately forms a larger bale. In the event loose material drops through the bottom inlet opening during core starting, such material is immediately returned to the chamber by the rigid tooth feeder along with other material delivered to the rigid tooth feeder in the meantime.

15 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

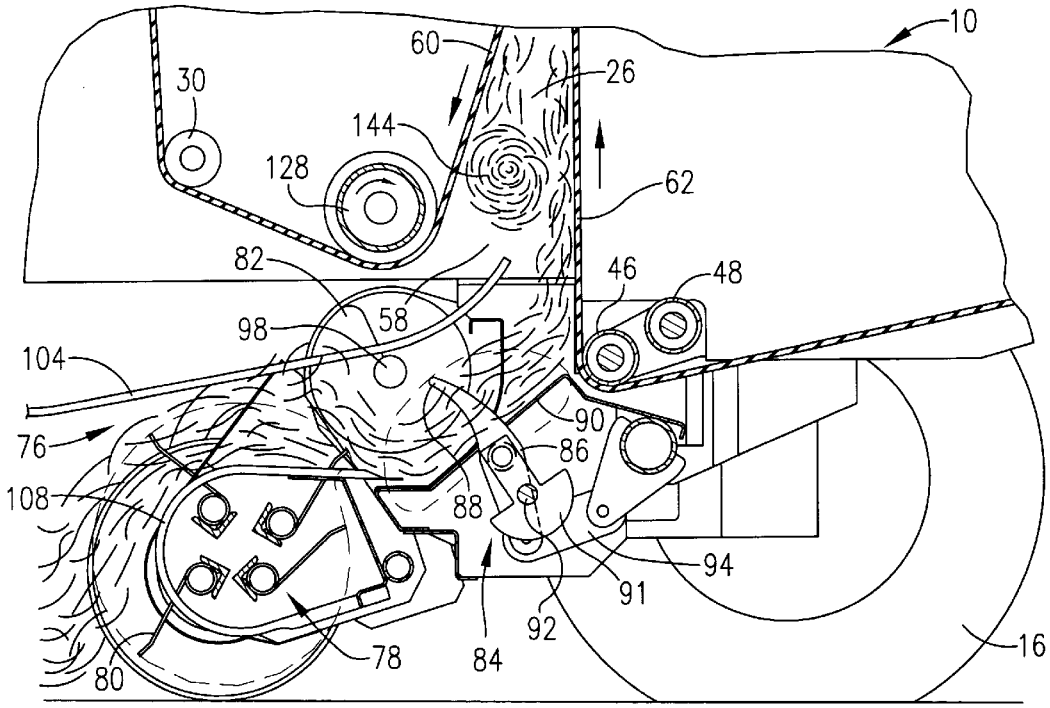
FIG. 5.
FIG. 6.
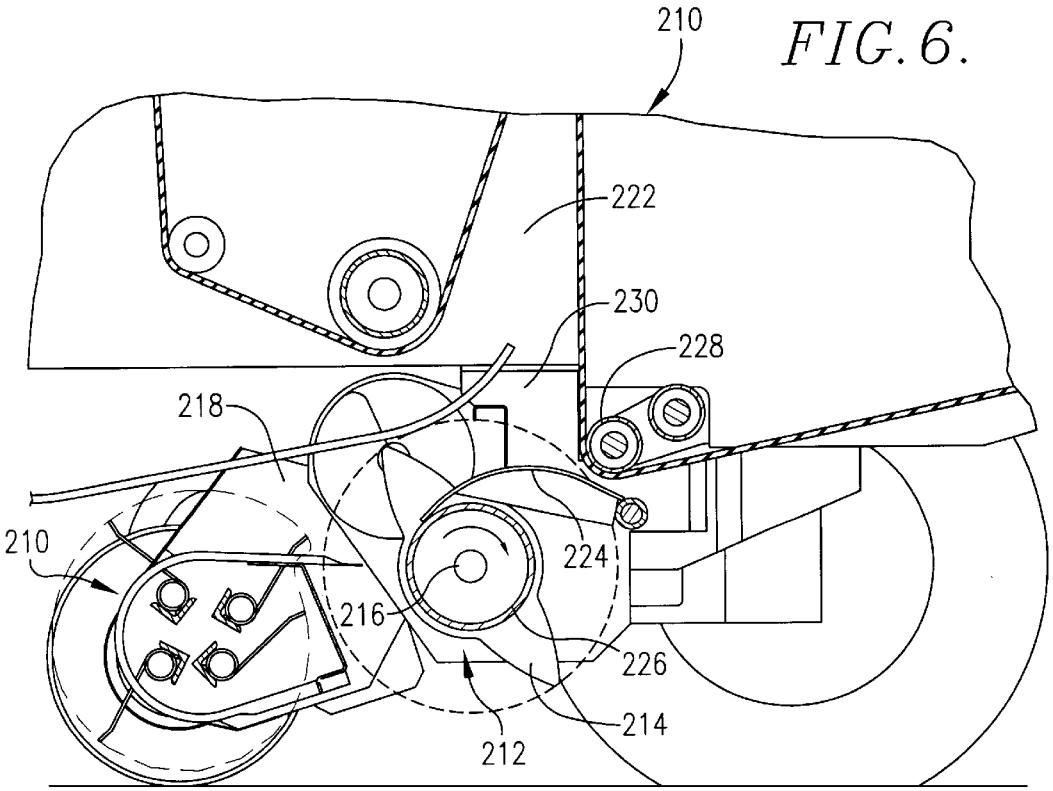

VERTICAL CHAMBER, OPEN THROAT ROUND BALER HAVING NO STARTER ROLL

TECHNICAL FIELD

The present invention relates to round balers and, more particularly, to open throat, vertical chamber machines in which the bale is formed, from start to finish, up in the vertical chamber above a relatively wide open inlet in the bottom of the chamber.

BACKGROUND

The open throat, vertical chamber style of round baler has become the standard in the industry for variable chamber machines. Such machines operate on what may be described as a single-stage baling principle in which the bale is formed from beginning to end in the same chamber. Thus, at the start of a new baling cycle, incoming crop material is fed directly into the forming chamber instead of first entering into some kind of a small, precompression starting chamber beside or below the main chamber as in two-stage machines. In such two-stage machines, the incoming material during stage one at the beginning of a new baling cycle coils into a precompressed, relatively dense core within the small starting chamber before it then deflects a forming belt sufficiently to push its way into the main chamber, where it completes its formation in stage two.

The open throat, vertical chamber machine is an excellent starting machine because there is no attempt to coil or compress the crop material until it is first safely inside the baling chamber. It also starts well because of its vertical orientation at the beginning of a new baling cycle when an upwardly moving surface at the rear of the chamber lifts and tumbles the crop forwardly, while a downwardly moving surface at the front of the chamber lowers and coils the crop onto itself.

However, the chamber is supplied with material through a relatively wide, non-compressive inlet opening at the bottom of the chamber. Therefore, unless the starting material quickly forms into a coil that is larger than the width of the opening, there may be a tendency in some crop conditions for the downwardly moving material at the front of the chamber to come back down out through the opening. If it lands on the relatively skimpy, resilient rake tines of the pickup mechanism, the tines may not be strong enough to feed the mass of fallen material back up into the chamber. Consequently, the machine may plug.

In the past a starter roll has typically been provided at the bottom of the chamber in such a position that material coming down the front stretch of the chamber encounters the rearwardly rotating roll and is directed back toward the rear of the chamber, where it is picked up by the upwardly moving, rear surface and lifted upwardly with other incoming material. However, starter rolls have a tendency to wrap with crop materials in certain conditions and are also fairly expensive, considering not only the cost of the rolls themselves, but also that of the drives and bearings for the rolls.

Therefore, for many years there has been a long-felt need in the industry to find a way to eliminate starter rolls in open throat, vertical chamber machines. Yet, various attempts to solve this problem have produced only mixed results.

SUMMARY OF THE PRESENT INVENTION

Accordingly, the primary object of the present invention is to provide a design for a reliable, good starting, commercially successful, open throat vertical chamber machine that avoids the need for a conventional starter roll. This objective is carried out in the present invention by providing a rigid tooth feeder below the open throat of the chamber generally vertically aligned with and under the inlet opening of the chamber. A resilient rake tine assembly located ahead of the rigid tooth feeder picks up material from the field and moves it toward the chamber, where it is engaged by the rigid tooth feeder and delivered into the chamber. If any material happens to drop down out of the chamber at startup due to the absence of a starter roll, the rigid tooth feeder promptly returns it back up into the chamber with other incoming material.

BRIEF DESCRIPTION OF THE DRAWINGS

FIG. 5 is a slightly enlarged, fragmentary, left side elevational of the baler with the left sidewall removed illustrating the manner in which a core is started in the baling chamber; and FIG. 6 is a fragmentary left side elevational view similar to FIG. 5 of an alternative embodiment of the invention.

DETAILED DESCRIPTION

Figure 1:
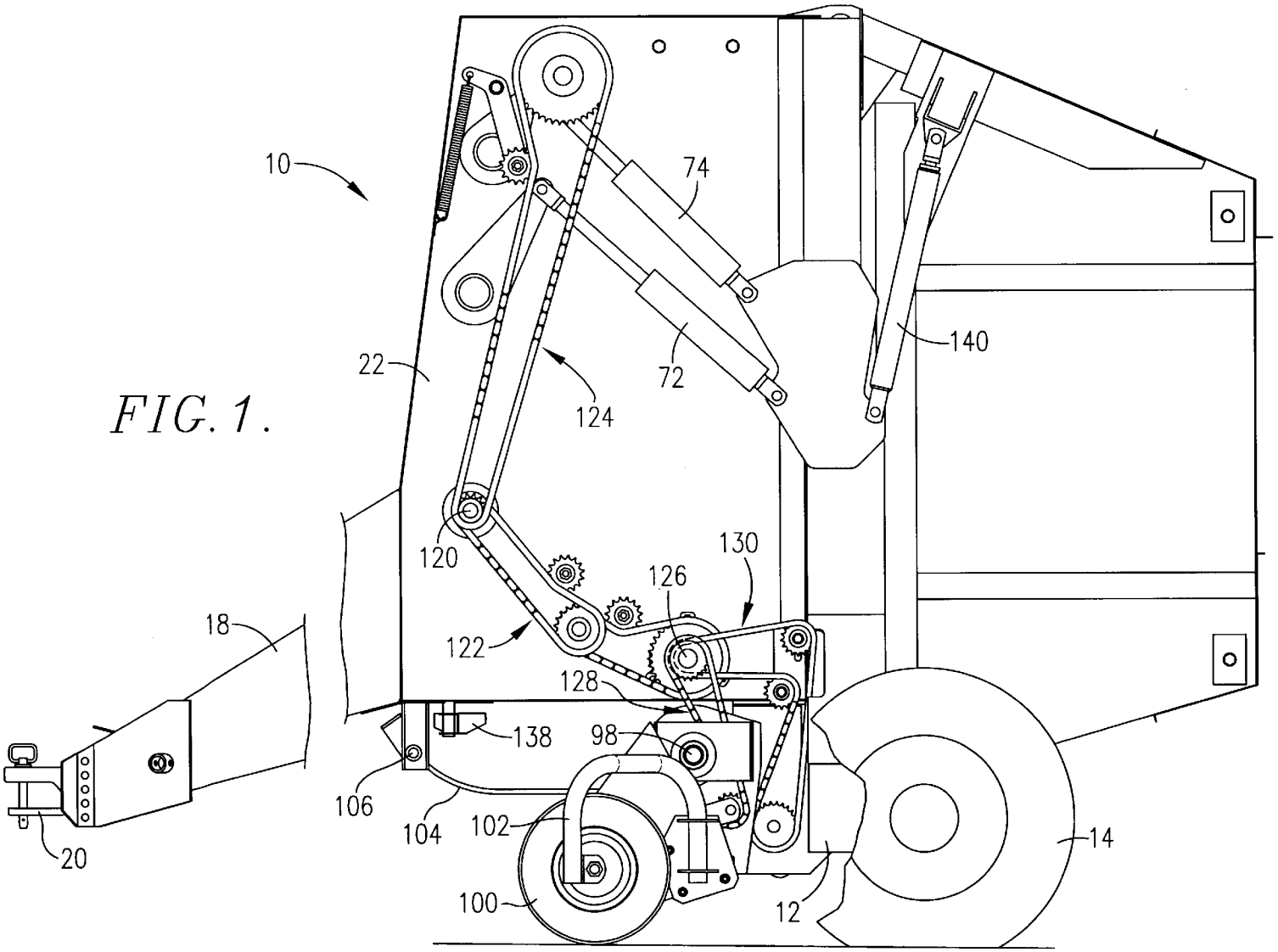
FIG. 1 is a left side elevational view of a baler incorporating the principles of the present invention.

The embodiment of the invention illustrated in the figures includes a baler 10 having a chassis 12 that is supported for travel by a pair of ground wheels 14 and 16. A tongue 18 projects forwardly from the chassis 12 and has a suitable hitch 20 at its front end for connecting the baler to a towing tractor (not shown). A pair of laterally spaced apart sidewalls 22 and 24 are mounted on the chassis 12 and project upwardly therefrom. The space between the two sidewalls 22 and 24 comprises the area in which the baling and wrapping cycles are carried out, as will be explained below.

The baler 10 has a number of transverse rolls and belts that cooperate with the sidewalls 22,24 to define an internal baling chamber 26 that assumes different shapes and sizes throughout the bale-forming cycle. As illustrated best in FIG. 3, the transverse rolls include a lower drive roll 28, a lower idler roll 30, an upper drive roll 32 and idler rolls 34, 36, 38, 40, 42, 44, 46, 48, 50, 52 and 54. A series of endless, flexible, side-by-side belts 56 are looped around the rolls 28–54 in the pattern illustrated in FIG. 3. The drive roll 28 and the idler roll 46 are located at the bottom of the baling chamber 26 and are spaced apart in a generally fore-and-aft direction to define a non-compressive, chamber inlet opening 58 therebetween. The belts 56 are looped under the drive roll 28, under the rear idler roll 46, and over the large upper idler roll 52 so that the belts 56 present a pair of generally vertical or upright belt stretches 60 and 62 when the baling chamber 26 is empty at the beginning of a baling cycle as illustrated in phantom lines in FIG. 3.

A tensioning arm assembly 64 having a pair of vertically swingable arms 66 located inside the baler adjacent the two walls 22 and 24 (only one of such arms being illustrated) supports the two idler rolls 50 and 54 in a position to directly overlie the bale during its formation within the chamber 26. The rolls 50 and 54 are spaced apart by a distance which is much less than the width of the inlet opening 58, and the vertical belt stretches 60 and 62 are confined between the rolls 50 and 54 so that the rolls 50,54 serve to converge the belt stretches 60,62 toward one another as the rollers 50,54 are approached. Since the rollers 50,52 are essentially directly above the inlet opening 58, the rolls 50,54 cause the chamber 26 to assume a generally vertical, triangular configuration when the chamber 26 is empty as illustrated in phantom in FIG. 3 and the arms 66 are down as also illustrated in phantom in FIG. 3. With the drive rolls 28 and 32 rotating clockwise viewing FIG. 3, this imparts a downward motion to the front belt stretch 60 and an upward motion to the rear belt stretch 62 when the chamber 26 is empty at the beginning of a new bale forming cycle. A slack control arm assembly 68 at the upper front comer of the baler includes a pair of vertically swingable arms 70 (only one being shown) that support the idler rolls 34 and 38 to control the amount of slack paid out to the belts 56 as the bale grows within the chamber 26.

The arm assemblies 64 and 68 may be of conventional construction as well understood by those skilled in the art. Alternatively, the arm assemblies 64 and 68 may be constructed in accordance with the disclosure in co-pending, contemporaneously filed application Ser. No. 08/897,466 now U.S. Pat. No. 5,839,362 titled "Single Cylinder Hydraulic Tension Control System for Round Balers". The embodiment of the invention illustrated herein is constructed in accordance with the disclosure of the above identified application such that the baler 10 uses a single hydraulic cylinder 72 on the left side of the machine (FIG. 1) to tension the arm assembly 64 and another single cylinder 74 on the left side to tension the slack control assembly 68.

As well known by those skilled in the art, the vertical chamber 26 may be formed by structures other than the belts 56 of the illustrated embodiment. For example, either or both of the stretches 60,62 could be presented by a series of transverse rolls supported in generally vertically stacked, side-by-side relationship, with each stack of rolls being swingable away from the upright or vertical starting condition to expand the chamber as the bale grows larger. A combination of belts and rolls could be used. The important principle is that, whatever structure is used, it presents a generally upwardly moving rear surface and a generally downwardly moving front surface for the baling chamber when the chamber is small at the beginning of each new bale forming cycle.

The baling chamber 26 is obviously located well above and off the ground. Therefore, some means must be provided for picking up crop materials as the baler moves across the field and for delivering the picked-up materials into the chamber 26. In accordance with the principles of open throat, vertical chamber baling, the incoming crop material is not to be subjected to any significant compression until it passes through the inlet opening 58 and is fully received within the baling chamber 26. Thus, that part of the crop flow path upstream from the chamber 26 is open and noncompressive and may be described as an open throat 76 (FIG. 5) through which the picked-up crop material passes on its way to the baling chamber 26.

In the illustrated embodiment the crop material is picked up off the ground by a standard resilient rotary rake tine assembly 78 located below and forwardly of the chamber 26 and its inlet opening 58. The assembly 78 is thus positioned along the lower portion of the throat 76 and cooperates with the lower drive roller 28 in helping to define the throat 76. The resilient rake tines 80 of the assembly 78 describe a somewhat circular path of travel as shown in phantom lines in FIG. 3, although the tines 80 actually are cam-operated and are caused to retract along the rear stretch of their path of travel.

If the rake tine assembly 78 selected for use is wider than the chamber 26 in a direction transverse to the path of travel of the machine, the picked-up material must be converged toward the center by center-gathering stub augers 82 or the like before being delivered into the chamber 26. One suitable stub auger construction for accomplishing this function is disclosed in co-pending application Ser. No. 08/731,764, filed Oct. 18, 1996 and titled "Down Turning Stub Augers on Wide Pick-Up for Round Balers". If the rake tine assembly 78 is the same width as the chamber 26, center-gathering mechanism is not needed.

A rigid tooth feeder 84 is positioned below and in vertical alignment with the inlet opening 58 between the resilient rake tine assembly 78 and the lower idler roll 46 along the lower stretch of the throat 76. Feeder 84 is spaced below the lower drive roll 128 and helps to define the throat 76. In the preferred embodiment, the feeder 84 takes the form of a fork 86 having a series of transversely spaced, rigid teeth 88 that move in a generally kidney-shape path of travel illustrated in phantom lines in FIG. 3. The teeth 88 project into the throat 58 during a stuffing stroke along the upper half of their path of travel and retract down out of the throat 76 during a return stroke along the lower half of their path of travel. A slotted ramp 90 spanning the distance between the resilient tine assembly 78 and the lower idler roll 46 provides a floor for the throat 58 in the vicinity of the rigid tooth feeder 84 and serves as a stripper plate through which the teeth 88 may retract to release the crop material at the rear end of the path of travel of the teeth 88.

Figure 3:
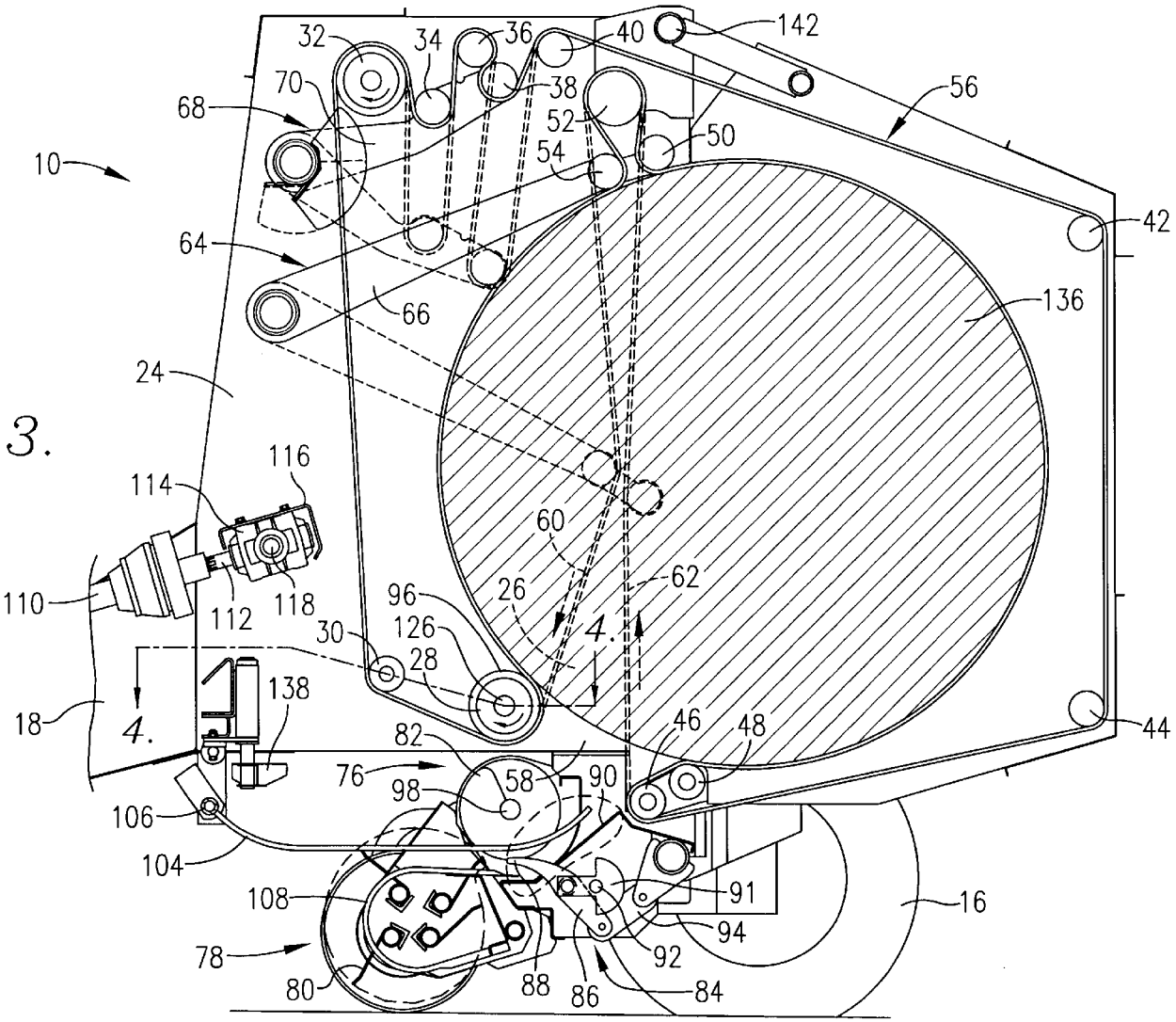
FIG. 3 is a fragmentary, left side elevational view of the baler with the near sidewall removed and with a full-size bale shown therein, the phantom lines in the bale chamber area indicating the condition of the bale chamber and related components when the chamber is empty at the beginning of a new baling cycle.

The fork 86 is pivotally supported by a rotating carrier 91 that rotates continuously about a transverse horizontal axis 92. The fork 86 is connected near its mid-point to the carrier 91 and has its lower extended end pivotally connected to a control link 94 pivotally coupled with the chassis 12. Thus, although the carrier 91 rotates in a circular path of travel, the fork 86 is constrained to move in its kidney-shape path of travel as illustrated. As shown in FIG. 3, the idler rolls 46 and 48 cooperate with the ramp 90 when the bale in chamber 26 grows larger than a starting core to define an eased inlet for material entering the chamber 26 as disclosed in co-pending application Ser. No. 08/731,395, filed Oct. 18, 1996, titled "Eased Inlet Tailgate Roll Arrangement for Variable Chamber Round Baler".

Contrary to prior open throat, vertical chamber constructions, the baler 10 has no starter roll located in the chamber 26 behind the lower drive roll 28. However, also contrary to prior open throat vertical chamber constructions, the baler 10 has the rigid tooth feeder 84 disposed below the open bottom of the chamber 26 in vertical alignment with the inlet opening 58. Consequently, the rigid tooth feeder 84 is positioned for projecting crop materials into the chamber 26 during successive stuffing strokes, whether such materials comprise only incoming materials received from the resilient tine assembly 78 or also materials that may have fallen down out of the chamber 26 during the early stages of bale core starting.

Figure 4:
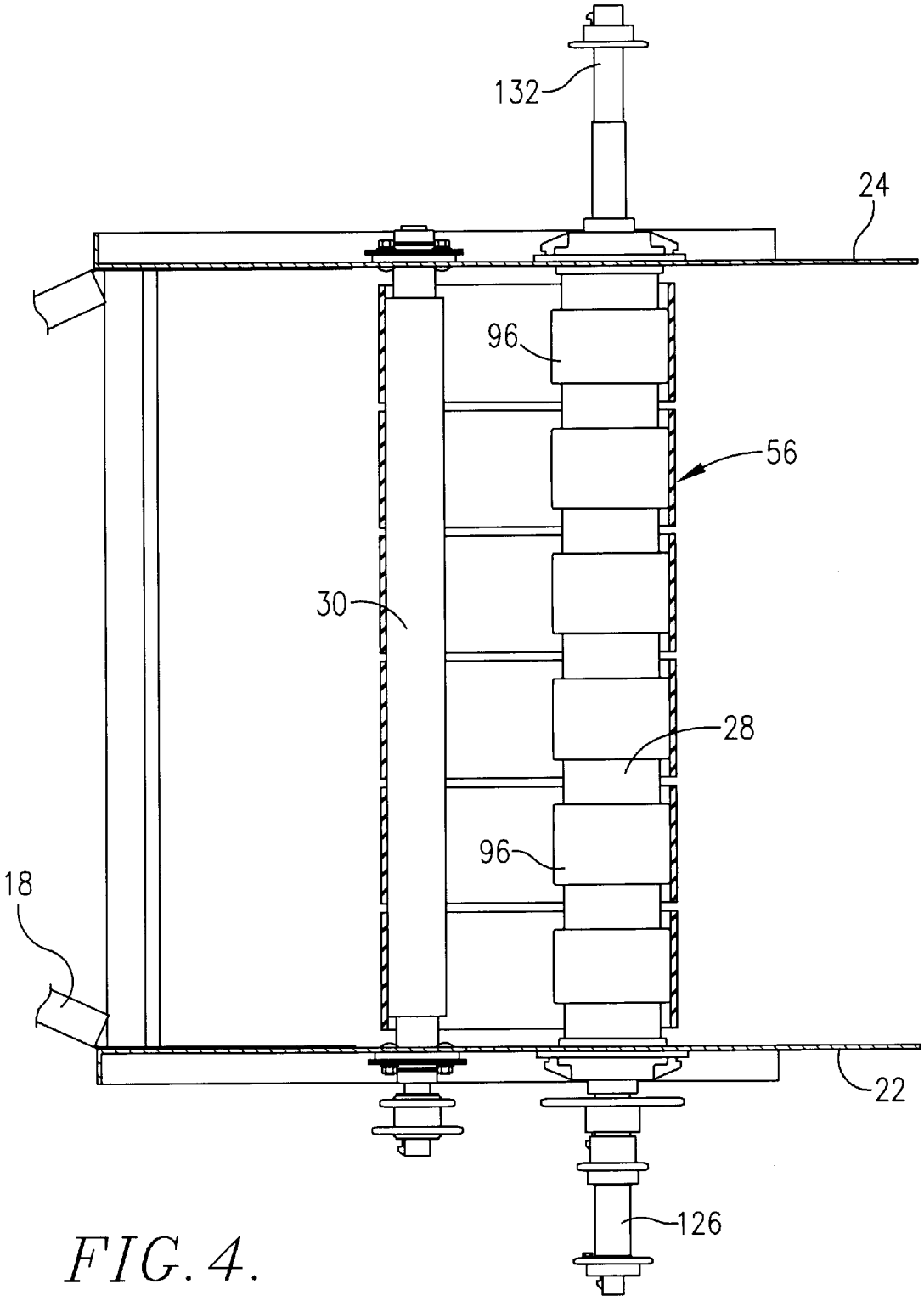
FIG. 4 is a generally horizontal cross-sectional view of the lower drive roll area of the baler taken substantially along line 4—4 of FIG. 3.

In order to prevent trash build-up above the drive roll 28 that may have been caused by the belts 56 sloughing off materials from the bale in the chamber 26, the drive roll 28 is provided with a series sleeves 96 that underlie the belts 56 as illustrated in FIG. 4. The sleeves 96, the belts 56 and the main cylindrical body of the drive roll 28 are preferably related to one another in the manner disclosed in co-pending application Ser. No. 08/733,757, filed Oct. 18, 1996, titled "Tall Sleeves for Round Baler Drive Rolls".

In the illustrated embodiment, the resilient rake tine assembly 78 is mounted on the chassis 12 for up and down swinging movement about a transverse axis 98 (FIGS. 1 and 2) which coincides with the axis of rotation of the stub augers 82. Gauge wheels 100 secured to the resilient rake tine assembly 78 by inverted, generally U-shaped arms 102 ride along the ground to cause the resilient tine assembly 78 to swing up or down as necessary to accommodate changes in ground contour. It will be noted that in the illustrated embodiment, the stub augers 82 and the rigid tooth feeder 84 do not pivot with the resilient tine assembly 78 but are instead mounted in fixed positions on the chassis 12. However, it is within the scope of the present invention to have all three of the components comprising the rake tine assembly 78, the rigid tooth feeder 84 and the stub augers 82 constructed as part of a header unit swingably attached to the chassis 12. In the illustrated embodiment, the gauge wheels 100 are attached to the resilient tine assembly in the manner disclosed and claimed in co-pending application Ser. No. 08/733,758, filed Oct. 18, 1996, and titled "Over-the-Top Support Arm for Pick-Up Gauge Wheel of a Baler".

As illustrated particularly in FIGS. 3 and 5, the baler 10 is provided with a standard windguard 104 overlying the resilient rake tine assembly 78. The windguard 104 is pivoted to the chassis 12 at pivot 106 and is biased by gravity to lie against the wrapper 108 of the resilient tine assembly 78 and the ramp 90 associated with the rigid tooth feeder 84. As incoming crop material flows through the throat 76, the windguard 104 is raised off the wrapper 108 and the ramp 90 by the moving crop material as illustrated in FIG. 5. However, the windguard 104 provides no significant compaction of the crop material.

Figure 2:
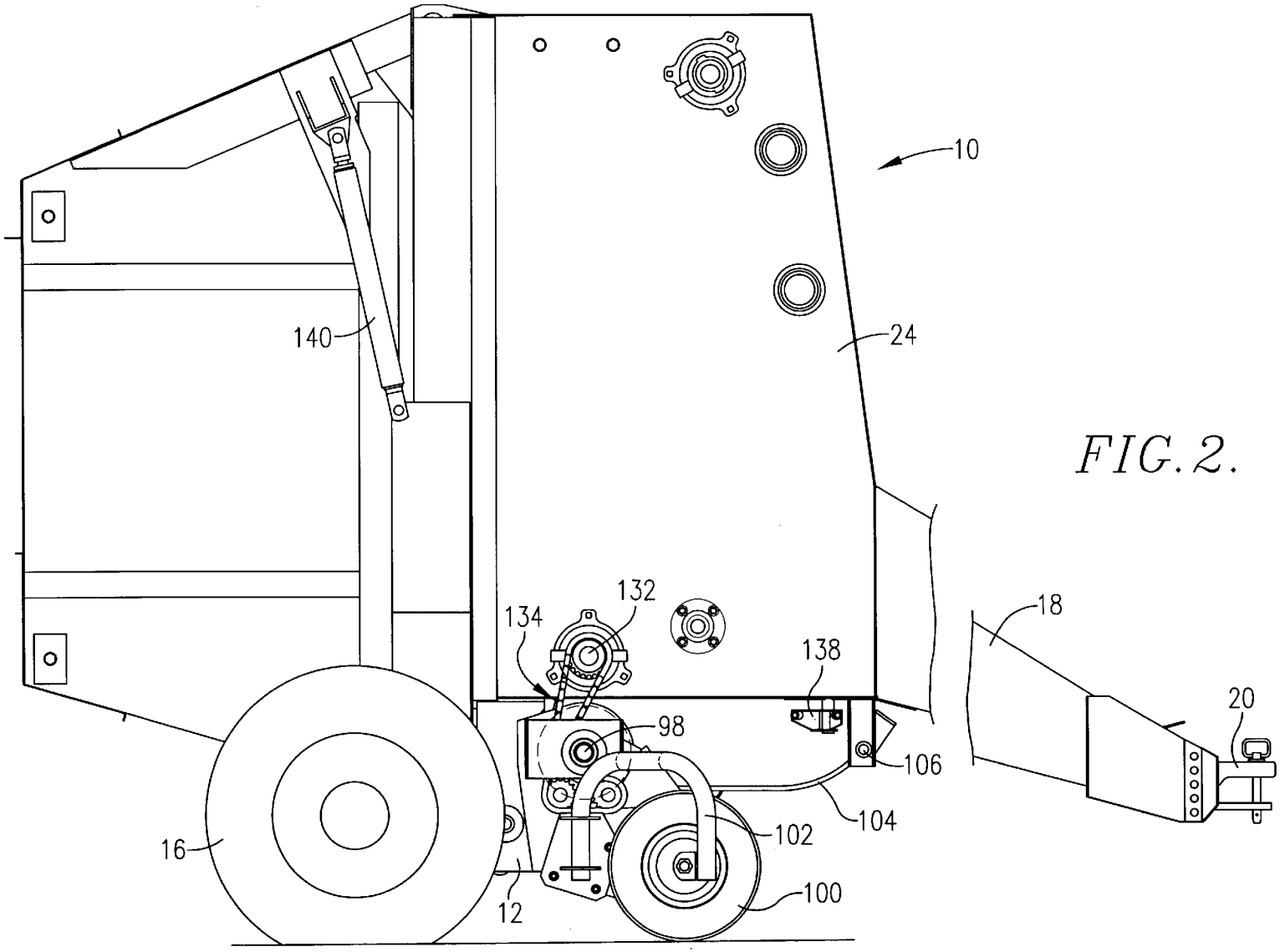
FIG. 2 is a rightside elevational view thereof.

As illustrated in FIG. 3, power for operating the components of the baler is delivered by a driveline 110 associated with the tongue 18. The front end of the driveline 110 is adapted for connection to the power take-off shaft (not shown) of the towing vehicle, while the rear end of the driveline 110 is coupled with the input shaft 112 of a right angle gear box 114 on a transverse structural member 116 of the chassis 12. The output shaft 118 of the right angle gear box 114 is coupled with a shaft 120 (FIG. 1) that extends over to the left sidewall 22 where it is journaled for rotation. The shaft 120 projects outwardly beyond the left sidewall 22 where it transfers driving power to the lower drive roll 28 and the upper drive roll 32 via respective chain and sprocket assemblies 122 and 124. The stub shaft 126 projecting from the left end of the drive roll 28 is drivingly coupled with the left stub auger of the pair of augers 82 and the rigid tooth feeder 84 via respective chain and sprocket assemblies 128 and 130. As shown in FIG. 2, the stub shaft 132 projecting from the right end of the drive roll 28 is operably coupled with the right stub auger of the pair of augers 82 by a chain and sprocket assembly 134.

When the bale is fully formed within the chamber 26 as illustrated by the bale 136 in solid lines in FIG. 3, it may be wrapped by a suitable wrapper before being discharged from the baler. In the illustrated embodiment, a twine dispenser 138 is located adjacent the front of the baler above the windguard 104 for wrapping the finished bale with twine during the wrapping cycle of the machine. Once wrapped, the bale may be discharged from the baler by operating a pair of lift cylinders 140 on opposite sides of the machine to elevate the rear half of the sidewalls 22,24 and their associated rolls 42, 44, 46 and 48. The rear half of the machine thus finctions as a tailgate that is attached to the front half and pivots relative thereto about an upper pivot 142 at the top of the baler.

OPERATION

At the beginning of each new bale forming cycle, the empty baling chamber 26 is generally upright and triangular as shown in phantom lines in FIG. 3. This condition is also illustrated in full lines in FIG. 5, which also shows the flow of incoming material and the commencement of a bale core 144. The core 144 is started by the oppositely moving belt stretches 60 and 62 which lift the incoming material at the rear and lower it at the front so as to impart a forward tumbling and coiling action to the material. As additional material continues to be fed into the chamber 26, the core 144 starts to grow and deflects the belt stretches 60,62 in opposite fore-and-aft directions. Eventually, the bale grows so much that it assumes the configuration of the bale 136 in FIG. 3, which is ready for wrapping and ejection.

As illustrated in FIG. 5, formation of the core 144 takes place without the usual starter roll. In most cases, the belt stretches 60 and 62, which are converging upwardly toward one another due to the gathering action of the idlers 50 and 54, are so effective that they immediately coil the incoming material into a mass of sufficient size that it stays up in the bale chamber 26. In certain crop conditions, however, the initial tumbling material may either fall out of the chamber 26 or be driven out by the downwardly moving belt stretch 60 at the front of the chamber. If that occurs, the rigid tooth feeder 84 simply flings the loose matter back up into the chamber in engagement with the rear belt stretch 62, along with the additional incoming material. Within only a few strokes of the rigid tooth feeder 84, the core 144 should be of sufficient size to fully bridge the gap between the drive roll 28 and the lower rear roll 46 so as to stay up in the chamber 26 for the duration of the forming cycle.

During development of the present invention, it was confirmed that if a resilient rake tine assembly such as the assembly 78 were used in lieu of the rigid tooth feeder 84 as the mechanism for delivering crop material into the chamber 26, a starter roll should also be installed in order to provide best results in all crop conditions. Having a small, clockwise-rotating starter roll immediately behind the drive roll 128 had the effect of forming a ledge or shelf to intercept material driven downwardly toward the inlet opening 58 by the front belt stretch 60. Since the upper periphery of such a starter roll moved rearwardly toward the rear belt stretch, the starter roll had the effect of deflecting the downwardly moving material back to the rear of the chamber where it could be re-engaged by the upwardly moving rear stretch. The starter roll thus kept the material up in the baling chamber, and kept it turning.

Without the starter roll, while a resilient tine assembly alone worked in many conditions, in some conditions it did not. Apparently, the failures were caused when loose material in the baling chamber fell back down through the inlet opening and onto the resilient tines, rendering them ineffective. The extra mass of material was apparently too heavy for the resilient tines and they were unable to reintroduce the material into the chamber along with the new material that had been added to the throat area in the meantirne.

By employing both a resilient tine assembly and a rigid tooth feeder along the lower extremity of the open throat in accordance with the present invention, a starter roll can be eliminated. The resilient rake tine assembly 78 provides the thorough and effective pick-up of crop materials from the ground that is necessary and desirable for a baler of this type, while the rigid tooth feeder 84 propels the picked up material on into the chamber 26 with sufficient force to handle any material that might be reluctant to stay up in the chamber 26 at start up. Consequently, the advantages of an open throat vertical chamber machine can be achieved without the disadvantages of a starter roll.

ALTERNATIVE EMBODIMENT

FIG. 6 shows an alternative embodiment 210 in which the rigid tooth feeder of the present invention takes the form of a rotating rotor 212 with generally radially projecting, rigid teeth 214. The rotor 212 rotates about a transverse axis 216 in a clockwise direction viewing FIG. 6, and the teeth 214 sweep upwardly into and along the throat 218 to propel material received by the resilient tine assembly 220 into the chamber 222. A stripping grid 224 overlies the space between the hub 226 of the rotor 212 and the lower idler roll 228 to strip material from the teeth 214 as the rotor 212 takes the material from the tine assembly 220 and projects it into the chamber 222 through the inlet opening 230. In all other significant respects, the baler 210 is very similar to the baler 10 of FIGS. 1–5.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor(s) hereby state their intent to rely on the Doctrine of Equivalents to determine and assess the reasonably fair scope of their invention as pertains to any apparatus not materially departing from but outside the literal scope of the invention as set out in the following claims.

We claim:

1. A no starter roll, open throat, vertical chamber round baler comprising:

an initially relatively small and generally upright baling chamber having an inlet located adjacent the bottom of the chamber, said chamber being defined in part by a pair of oppositely moving, front and rear surfaces wherein the front surface moves generally downwardly toward the inlet and the rear surface moves generally upwardly away from the inlet when the chamber is small at the beginning of each bale forming cycle, said inlet being defined in part by the space between a pair of transverse rolls that are separated from one another in a generally fore-and-aft direction, the bale being disposed above said rolls throughout each bale forming cycle including the initial stages of formation when a small core is starting in the chamber and the latter stages of formation when the bale has a crosssectional diameter that greatly exceeds the width of the inlet;

a resilient rotary rake tine assembly positioned below and ahead of the inlet for lifting crop materials off the ground and feeding them toward the inlet as the baler moves across a field; and a rigid tooth feeder positioned below and in vertical alignment with the inlet between the resilient rake tine assembly and the rear roll for projecting materials from the rake tine assembly into the chamber, said resilient tine assembly and said rigid tooth feeder being spaced below the front roll of the pair of rolls and cooperating with the front roll to define an open, non-compressive throat on the upstream side of the chamber that leads to the inlet, said chamber being devoid of a starter roll in the space between said pair of transverse rolls.

2. A no starter roll, open throat, vertical chamber round baler as claimed in claim 1, said front surface of the chamber being defined by a stretch of flexible belts.

3. A no starter roll, open throat, vertical chamber round baler as claimed in claim 2, said rear surface of the chamber being defined by a stretch of flexible belts.

4. A no starter roll, open throat, vertical chamber round baler as claimed in claim 1, said rigid tooth feeder comprising a stuffer fork that operates in a generally kidney-shaped path of travel in successive stuffing and return strokes, the fork having teeth that project up into the throat while moving toward the inlet and retract down out of the throat during each return stroke while moving generally away from the inlet.

5. A no starter roll, open throat vertical chamber round baler as claimed in claim 4, said front surface of the chamber being defined by a stretch of flexible belts.

6. A no starter roll, open throat, vertical chamber round baler as claimed in claim 5, said rear surface of the chamber being defined by a stretch of flexible belts.

7. A no starter roll, open throat, vertical chamber round baler as claimed in claim 6, the stretch of belts that define said front surface of the chamber being looped under the front roll of the pair of rolls.

8. A no starter roll, open throat, vertical chamber round baler as claimed in claim 6, the stretch of belts that define said rear surface of the chamber being looped under the rear roll of the pair of rolls.

9. A no starter roll, open throat, vertical chamber round baler as claimed in claim 8, the stretch of belts that define said front surface of the chamber being looped under the front roll of the pair of rolls.

10. A no starter roll, open throat, vertical chamber round baler as claimed in claim 1, said rigid tooth feeder comprising a rotor that operates in a circular path of travel, said rotor having teeth that project outwardly from the axis of rotation of the rotor and sweep into and through the throat generally toward the inlet during each rotation of the feeder.

11. A no starter roll, open throat, vertical chamber round baler as claimed in claim 10, said front surface of the chamber being defined by a stretch of flexible belts.

12. A no starter roll, open throat, vertical chamber round baler as claimed in claim 10, said rear surface of the chamber being defined by a stretch of flexible belts.

13. A no starter roll, open throat, vertical chamber round baler as claimed in claim 12, the stretch of belts that define said front surface of the chamber being looped under the front roll of the pair of rolls.

14. A no starter roll, open throat, vertical chamber round baler as claimed in claim 12, the stretch of belts that define said rear surface of the chamber being looped under the rear roll of the pair of rolls.

15. A no starter roll, open throat, vertical chamber round baler as claimed in claim 14, the stretch of belts that define said front surface of the chamber being looped under the front roll of the pair of rolls.

* * * * *